UNITED STATES PATENT OFFICE.

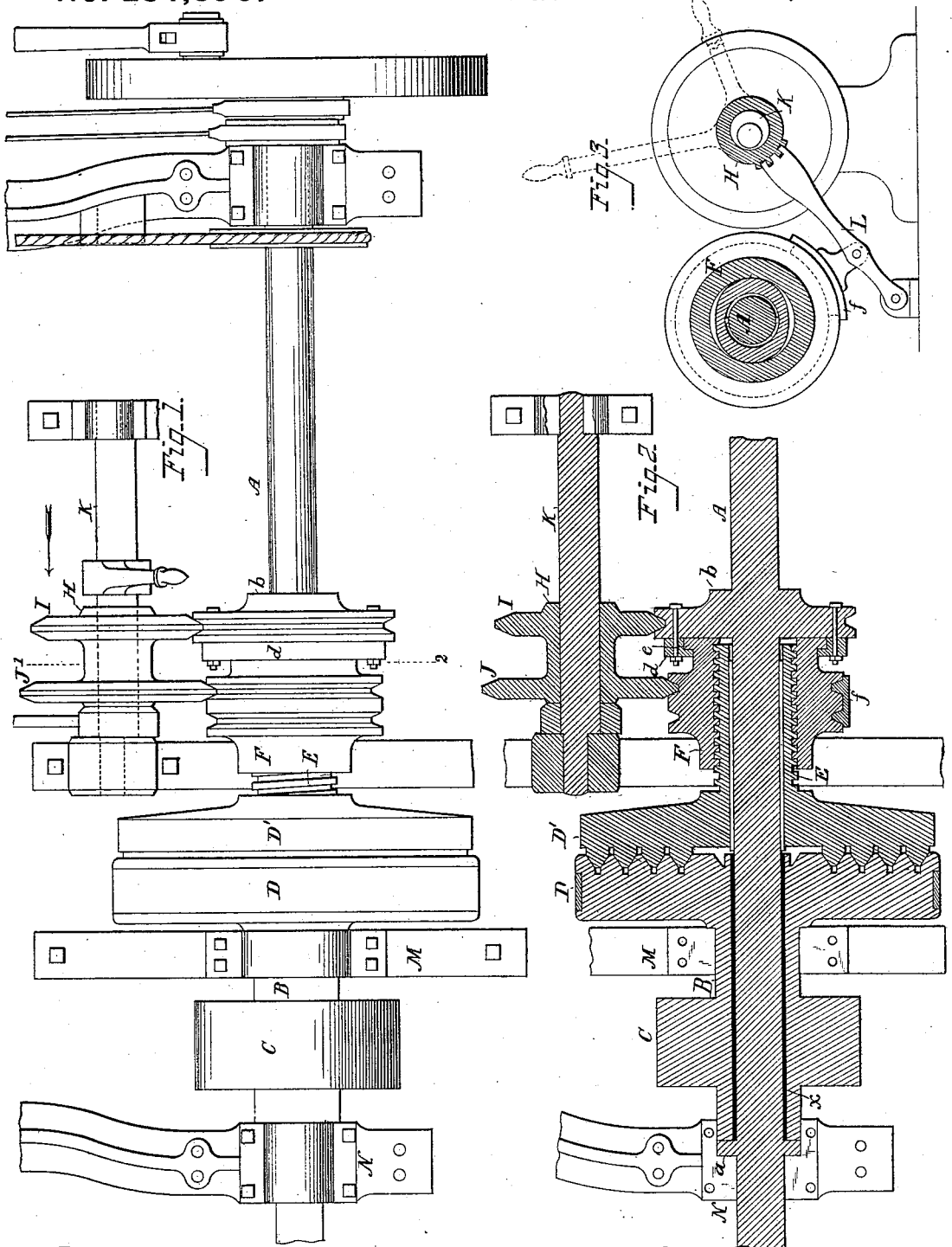

OLIVER S. PRESBREY, OF PORT HENRY, NEW YORK.

FRICTION-CLUTCH.

SPECIFICATION forming part of Letters Patent No. 234,890, dated November 30, 1880.

Application filed October 14, 1880. (No model.)

*To all whom it may concern:*

Be it known that I, OLIVER S. PRESBREY, of Port Henry, Essex county, New York, have invented certain Improvements in Friction-Clutches, of which the following is a specification.

My invention relates to clutches; and it consists in certain improved devices whereby I am enabled quickly and by the exertion of but little force to bring together with a powerful pressure friction-disks or other coupling appliances upon different shafts, and thereby transmit movement from one to the other. At the same time I avoid all back thrusts upon the pillow-blocks or bearings and reduce to a great degree the friction incident to running one of the clutch-shafts upon the other.

In the drawings forming part of this specification, Figure 1 is a plan view of sufficient of the clutch of a hoisting-engine to illustrate my invention. Fig. 2 is a longitudinal plan section. Fig. 3 is a transverse section on the line 1 2, Fig. 1, looking in the direction of the arrow.

In suitable bearings turn the journals of two shafts, A B; or the shaft B may be hollow and turn as a sleeve upon or round the driving-shaft A, as shown, a collar, *a*, bolted or forged on the shaft A, constituting the end bearing of the shaft B. Upon the shaft B are the pinion or band-pulley C and a disk, D, having a face of any suitable construction coinciding with and adapted to the face of a disk, D', carried by a sleeve, E, mounted upon the shaft A, so as to slide freely without turning thereon. As shown, the disks have friction-faces. The sleeve E is threaded externally to receive a nut, F, which has its bearing upon a permanent collar, *b*, bolted to or forged on the shaft A, and is provided with a flange, *e*, which is overlapped by a flanged wing, *d*, bolted to the collar, *b*, and serving to connect the nut to the collar without interfering with the free rotation of the nut. By imparting to the nut a rotation at greater or less speed than that of the shaft carrying it the said nut is caused to turn upon the sleeve E, thereby carrying the latter and its disk toward or from the disk D, according to the direction of the thread and the movement of the nut. By this means the disks may be rapidly brought together with an exceedingly powerful frictional pressure, so as to practically unite the shafts and impart rotation from one to the other. While the pressure thus applied is very great, there is no thrust whatever in consequence thereof upon the shaft-bearings, and consequently no loss of power by increased friction at such bearings, the thrust from the contact of the disks being all brought upon the collars *a b*, upon which there is no movement.

I do not limit myself to the precise construction of devices described, whereby disks are forced together and the thrust from the contact of the disks is brought upon the collars carried by the shaft A, as other means may be employed—as, for instance, toggle-joints placed between the collar *b* and disk D' may be used.

The movement of the disk D' toward the disk D may be effected by turning the nut F faster than the shaft A, or by applying friction to and retarding the nut, the thread of the sleeve E in such case being reversed.

In the drawings the construction shown is such that by imparting an increased speed to the nut the disks will be forced together, and the rotation of the nut is effected from the shaft A through the medium of a secondary shaft, H, carrying gears communicating the requisite motion.

Friction-gears are preferable, a friction-disk, I, carried by the shaft H, fitting a groove in the periphery of the collar *b*, and a disk, J, carried by said shaft, fitting a groove in the nut F, the gears being so proportioned that the rotation of the shaft A will impart a slightly-increased rotation to the nut, thereby securing an increase of power, adding greatly to the efficiency of the apparatus.

Differential toothed gear may be substituted for the differential friction-gear with a clutch between the wheels I J.

Where the gear described is used the same may be thrown into and out of contact by mounting the shaft E upon a rock-shaft, K, having eccentric journals, so that the turning of the shaft K will carry the shaft H and its disks to and from the shaft A.

To withdraw the disk D' when the shafts A B are to be uncoupled, friction should be applied to retard the rotation of the nut, this being effected by a friction-brake lever, L, carrying a shoe, f, and geared to the shaft K, so that the shoe will be applied to the nut by a continued rotation of the shaft K after the gear-wheels have been withdrawn. Other friction appliances may, however, be substituted for that above described. For instance, a strap may be passed around the nut and its ends connected to eccentric pins, so as to contract the strap round the nut when the gear-wheels are withdrawn. Any other suitable device may be used for this purpose.

One of the greatest difficulties arising in this class of engines, and in others where a sleeve turns upon a shaft, results from the heating of the sleeve and shaft and the expansion or warping of the latter so as to jam the sleeve upon the shaft.

Another objection is the wearing of the shaft and sleeve from their frictional contact. These objections I overcome by making the opening in the sleeve larger than the shaft, and mounting the sleeve in the pillow-blocks, so that there is no contact of the sleeve and shaft, no friction, heating, or wear, while the two are maintained concentric with each other. Thus there is a space, x, between the sleeve B and shaft A, and the sleeve is mounted in independent bearings of the pillow-blocks N M.

I claim—

1. The combination, in a friction-clutch, of a driving-shaft, a friction-disk mounted on and turning therewith, a second disk turning round said shaft, appliances, substantially as set forth, for bringing said disks together and separating them, and bearings arranged upon the driving-shaft to resist the thrust from both the disks, substantially as specified.

2. The combination, with shafts carrying clutch-disks, of a nut for moving one of the disks, and a supplemental shaft and differential gear whereby the nut is revolved from the driving-shaft, substantially as set forth.

3. The combination, with the central shaft and its disk, of a surrounding sleeve carrying a disk and having an opening larger than the shaft, and mounted in independent bearings, substantially as set forth.

4. The combination of the shaft and disk D, the driving-shaft, threaded sleeve carrying the disk D' and turning with the driving-shaft, nut F, carried by the driving-shaft and turning on the said sleeve, and appliances whereby the rotation of the nut may be accelerated and retarded, substantially as set forth.

5. The combination, with the shafts, disks, and nut, of the supplementary adjustable gears I J, a brake, and devices whereby the brake may be applied after the gears are thrown out of action, substantially as specified.

In testimony whereof I have signed my name to this specification in the presence of two subscribing witnesses.

OLIVER S. PRESBREY.

Witnesses:
CARLTON H. MERRILL,
WILLIAM P. HYDE.